Patented Jan. 1, 1952

2,580,852

UNITED STATES PATENT OFFICE 2,580,852

PREPARATION OF SILOXANES BY REACTING DIALKYLDICHLOROSILANES WITH CUPRIC OXIDE

Clifford Shaw, William Edwin Smith, and Harold Garton Emblem, London, England; said Emblem assignor to Clifford Shaw and William Edwin Langrish-Smith No Drawing. Application January 7, 1947, Serial No. 720,688. In Great Britain January 11, 1946

2 Claims. (Cl. 260—448.2)

This invention relates to an improved process for the production of organo-silicon polymers of the type derived from hydrolysis products of organo-silicon chlorides of the general formula $R_xSiCl_{4-x}$ where R=alkyl, aryl or aralkyl groups.

Numerous processes have been proposed hitherto for the production of polymeric silicones all based on the aqueous hydrolysis of organo-silicon chlorides with the formation of the corresponding hydroxy bodies and subsequent dehydration and various degrees of polymerisation by heat treatment. The processes require careful control and result in the formation of acid by-products.

It has now been found possible to proceed direct from the organo-silicon halide to the more or less polymerised silicone by refluxing the former under anhydrous conditions with or without an inert solvent in the presence of a basic metal oxide selected from the group of mild basic oxides consisting of copper, silver, beryllium, magnesium and zinc. The silicone obtained may be separated from the halide salts formed and excess oxide by distillation or solvent extraction and further polymerised by heat.

A reaction between $Ph_2SiCl_2$ and mercuric oxide has been described by Kipping and Vyle (Jour. Chem. Soc. 1924, p. 2616) but the reaction was carried out in the presence of toluene as a solvent and no suggestion is made in this prior disclosure that silicone polymers, useful in industry, can be obtained by direct refluxing of an organo-silicon halide with the oxide, nor that any oxide, other than mercuric oxide could be employed.

In the case of a silicon di-halide the reaction with a mildly basic oxide may be represented as follows:

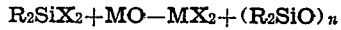

$$R_2SiX_2 + MO \rightarrow MX_2 + (R_2SiO)_n$$

where R is the hydrocarbon group and X is halogen.

The solid remaining after the reaction contains both halide and metal ions and is mainly the halide of the metal oxide employed.

Products from the silicon di-halides consist mainly of the di-substituted silicons with varying values of $n$.

In the same way as in hitherto known processes various polymers and co-polymers may be obtained according to the invention by using mixed substituted silicon halides as starting material.

The following examples illustrate the nature of the invention and the manner in which it may be carried out, the parts being parts by weight:

Example I 10.48 parts of diethyl silicon dichloride and 5.9 parts of cupric oxide were mixed and the initial reaction allowed to subside. The reaction mixture was then refluxed for six hours, and washed with three portions of ether (10 parts), to extract the reaction product. On removal of the ether, 2.14 parts of a colourless, viscous liquid remained, having a molecular weight of 960, and a silica content of 57.88%.

Example II 4.6 parts of cupric oxide was refluxed for four hours with a solution of 8.27 parts of diethyl silicon dichloride in an equal volume of petrol ether (B. P. 80°–100° C.). The petrol ether solution was then separated from the solid product, and the petrol ether removed by distillation, leaving 2.13 parts of a brown oily liquid, having a molecular weight of 670, and a silica content of 57.32%.

Example III 5.6 parts of diethyl silicon dichloride were refluxed with 3.2 parts of zinc oxide for six hours. The reaction product was extracted with petrol ether (60°–80° C.). After removal of this solvent, 3.66 parts of a colourless oily liquid remained. This liquid had a molecular weight of 499, and a silica content of 56.95%.

Molecular weights in the above examples were determined cryoscopically in benzene solution, and silica estimations were carried out by converting the compound to ash with concentrated sulphuric acid followed by ignition to constant weight.

What we claim is:

1. A process for the production of alkyl silicone polymers which comprises refluxing a dialkyl silicon dichloride under anhydrous conditions with cupric oxide and separating the silicone polymer from the metal salts formed.

2. A process for the production of alkyl silicone polymers which comprises refluxing diethyl silicone dichloride under anhydrous conditions with cupric oxide and separating the silicone polymer formed from the metal salt.

CLIFFORD SHAW.
WILLIAM EDWIN SMITH.
HAROLD GARTON EMBLEM.

REFERENCES CITED

The following references are of record in the file of this patent:

UNITED STATES PATENTS

| Number | Name | Date |
|---|---|---|
| 2,452,416 | Wright | Oct. 26, 1948 |

OTHER REFERENCES

Vyle et al., Journ. Chem. Soc. (London), 1924, and the petrol ether removed by distillation, pages 2616 to 2622.

Handbook of Chemistry and Physics, 27th edition, 1943, pages 312 and 313.

Ephraim-Thorne-Roberts, Inorganic Chemistry, 4th edition, Nordeman, 1943, pages 27 and 29.